(12) United States Patent
Shimada (10) Patent No.: US 8,787,136 B2
(45) Date of Patent: Jul. 22, 2014

(54) HOLOGRAPHIC MEMORY APPARATUS AND METHOD FOR ADJUSTING INCIDENT ANGLE OF REFERENCE BEAM

(71) Applicants: Hitachi-LG Data Storage, Inc., Tokyo (JP); Hitachi Consumer Electronics Co., Ltd., Tokyo (JP)

(72) Inventor: Kenichi Shimada, Tucson, AZ (US)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/875,687

(22) Filed: May 2, 2013

(65) Prior Publication Data

US 2014/0029404 A1    Jan. 30, 2014

(30) Foreign Application Priority Data

Jul. 30, 2012    (JP) .................................. 2012-167923

(51) Int. Cl.
*G11B 7/00*    (2006.01)
(52) U.S. Cl.
USPC .......................................................... 369/103

(58) Field of Classification Search
USPC .......................................................... 369/103
See application file for complete search history.

(56) References Cited

U.S. PATENT DOCUMENTS

| | | | |
|---|---|---|---|
| 7,808,876 B2 * | 10/2010 | Tanaka | 369/103 |
| 7,916,585 B2 * | 3/2011 | Saito | 369/44.27 |
| 8,130,620 B2 * | 3/2012 | Tanaka | 369/103 |
| 2008/0094998 A1 * | 4/2008 | Jeong et al. | 369/103 |
| 2009/0153929 A1 * | 6/2009 | Jeong et al. | 359/31 |
| 2009/0207710 A1 | 8/2009 | Ayres et al. | |

FOREIGN PATENT DOCUMENTS

| | | |
|---|---|---|
| JP | 2008-299992 | 12/2008 |
| JP | 2009-54214 | 3/2009 |

* cited by examiner

*Primary Examiner* — Brenda Bernardi
(74) *Attorney, Agent, or Firm* — Antonelli, Terry, Stout & Kraus, LLP.

(57) ABSTRACT

A holographic memory apparatus includes an optical detector which receives reflected light of reference beam from the surface of a hologram recording medium. An incident angle of the reference beam is estimated on the basis of information on a focused position on the optical detector. When the incident angle is different from a target incident angle, the incident angle of the reference beam is adjusted according to a difference between the incident angle and the target incident angle.

8 Claims, 10 Drawing Sheets

$\theta_i = \theta_B$

FIG.7B $\theta_i = \theta$

HOLOGRAPHIC MEMORY APPARATUS AND METHOD FOR ADJUSTING INCIDENT ANGLE OF REFERENCE BEAM

INCORPORATION BY REFERENCE

The present application claims priority from Japanese application JP 2012-167923 filed on Jul. 30, 2012, the content of which is hereby incorporated by reference into this application.

BACKGROUND OF THE INVENTION

The present invention relates to an apparatus for recording information on a recording medium by holography, an apparatus for reproducing the information from the recording medium, and a method for adjusting incident angle of reference beam.

At the present time, capacities of optical disks exceeding 100 GB have been attained based on BDXL (trade mark) format. In the future, further improvement of capacity will be required for optical disks due to tremendous growth of the field of information technology. In many research institutes, study has been made on next-generation storage techniques. As one of the storage techniques, attention is focused on a holographic recording technique. The holographic recording technique is a technique for recording information by overlapping signal beam having two-dimensionally modulated page data by a spatial light modulator with reference beam in a recording medium, and by producing refractive index modulation within the recording medium due to an interference pattern generated in the medium at the time. Since a plurality of pieces of page data can be multiple-recorded at the same location of the recording medium, higher-speed recording and a larger capacity can be attained. Up until now, a plurality of multiple recording techniques have been proposed, and a typical one of such techniques is angle multiplex recording. In an apparatus based on the angle multiplex recording, precise adjustment of an incident angle of reference beam becomes important. In US2009/0207710, for example, there is disclosed a method of, upon reproduction of a series of angle multiplex holograms, estimating an incident angle optimum for reproduction of a next hologram by use of a reproduction result of one of the holograms just before thereto or before by several ones.

JP-2009-54214, further, describes in Paragraph 0025 and so on that "When a beam spot is moved along a direction crossing an array direction of light receiving elements, an angle detection signal of the reference beam varies within a range between a certain constant positive potential and a negative potential. That is, the level of the angle detection signal of the reference beam varies according to the incident angle of the reference beam during recording. With such an arrangement, when the reference beam is applied so that the center of the beam spot is located on boundaries of mutually-adjacent light receiving elements of an optical detector 32, the reference beam angle detection signal has a level of zero. And, for example, the zero-cross point can be associated with the positioning point of the reference beam angle. In this case, for example, when the angle of the reference beam is suitable, the level of the reference beam angle detection signal becomes zero. When the level of the reference beam angle detection signal is zero or in a predetermined range within the vicinity of zero, the main controller 300 determines that the angle of the reference beam to be adequate."

SUMMARY OF THE INVENTION

In the method shown in US2009/0207710, SNR (signal to noise ratio) is defined as a quality evaluation index of a hologram reproduced image, and a variation in the S is used to estimate an optimum incident angle of the reference beam.

In US2009/0207710, in order to detect a variation in the SNR, an offset angle is intentionally added always by $+\Delta\Phi$ or $-\Delta\Phi$ and then reproduced. Although explanation of detailed technical contents is omitted because it is descried in US2009/0207710, since reproduction is made always with an angle shifted by about $\Delta\Phi$ with respect to the optimum incident angle of the reference beam, reproduction quality will be always deteriorated in principle.

Further, in order to calculate SNR, it becomes necessary to calculate it with use of an average value of brightness distribution of pixels to be originally turned ON and OFF and a standard deviation thereof in a hologram reproduced image. Thus, this requires more complicated signal processing than simple estimation of a light quantity.

In addition, because of the adjustment method of using SNR, it is necessary for a hologram for SNR calculation to be previously recorded, and this method is unsuitable for adjustment of an incident angle when a hologram is not preset yet is recorded.

JP-2009-54214 is directed to a technique for detecting the incident angle of reference beam but to the angle detection method not reflecting on a tilt of the disk. In a tilted state of the disk, a relative tilt between the disk and the reference beam cannot be strictly estimated.

In view of the above problems, the object of the present invention is to accurately adjust the incident angle of reference beam upon hologram recording and reproduction.

The above object is attained with the inventions disclosed, for example, in Claims.

In accordance with the present invention, the incident angle of the reference beam can be accurately adjusted upon recording and reproduction.

DETAILED DESCRIPTION OF THE EMBODIMENTS

Explanation will be made in connection with embodiments of the present invention by referring to the accompanying drawings.

Embodiment 1

Figure 1:
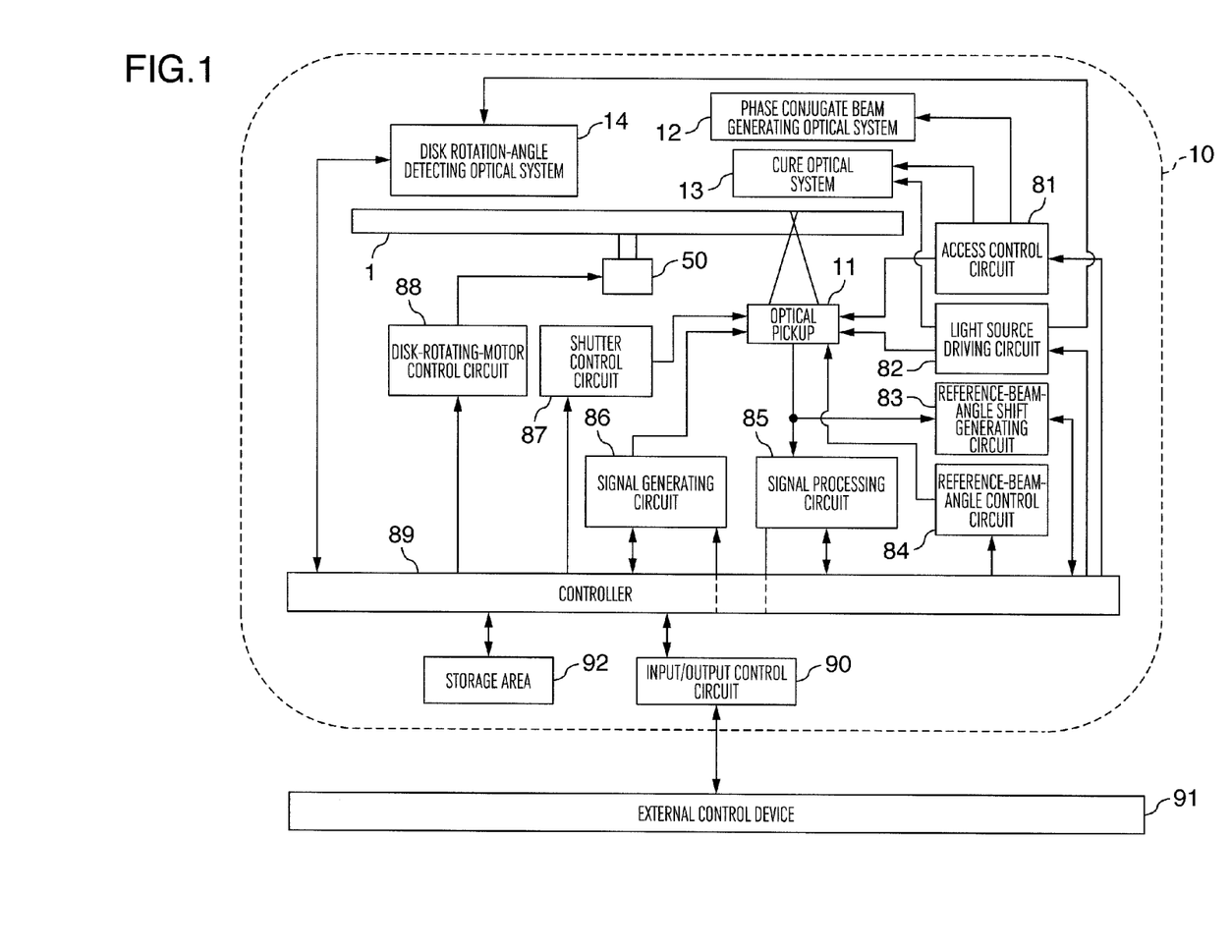
FIG. 1 is a block diagram showing an embodiment of an optical information recording/reproducing apparatus.

FIG. 1 is a block diagram of an embodiment of an optical information recording/reproducing apparatus for recording or reproducing digital information by holography. An optical information recording/reproducing apparatus 10 is connected to an external control device 91 via an input/output control circuit 90. When it is desired to record information, the optical information recording/reproducing apparatus 10 receives a recording information signal from the external control device 91 via the input/output control circuit 90.

When it is desired to reproduce the information, the optical information recording/reproducing apparatus 10 transmits the reproduced information signal to the external control device 91 via the input/output control circuit 90.

The optical information recording/reproducing apparatus 10 includes an optical pickup 11, an optical system for generating a phase conjugate beam 12, a cure optical system 13, an optical system for detecting a disk rotation angle 14, and a rotating motor 50. An optical-information recording medium 1 is arranged to be rotated by the rotating motor 50. For the optical pickup 11, phase conjugate beam generating optical system 12, cure optical system 13 and disk rotation angle detection optical system 14, several or all optical systems of them may be integrated for simplification.

The optical pickup 11 plays a role of emitting reference beam and signal beam toward the optical-information recording medium 1 and recording digital information on the recording medium by holography. At this time, the recording information signal is sent from a controller 89 via a signal generating circuit 86 to a spatial light modulator (which will be explained later) located in the optical pickup 11, and the signal beam is modulated by the spatial light modulator.

When it is desired to reproduce information recorded on the optical-information recording medium 1, reference beam emitted from the optical pickup 11 is directed to the optical information recording medium in a direction opposed to the direction of the case of recording, to generate a phase conjugate beam of the reference beam by the phase conjugate beam generating optical system 12. Reproduced light reproduced by the phase conjugate beam is detected by the optical detector (which will be explained later) located within the optical pickup 11, and then reproduced by a signal processing circuit 85 into a signal. The irradiation times of the reference beam and signal beam to be applied on the optical-information recording medium 1 can be adjusted by controlling the open/close time of a shutter within the optical pickup 11 under control of the controller 89 via a shutter control circuit 87.

The cure optical system 13 plays a role of generating a light beam for use in the precure and postcure of the optical-information recording medium 1. The precure is a preceding step of applying a predetermined light beam prior to irradiation or application of the reference beam and the signal beam at a desired position when it is desired to record information at the desired position within the optical-information recording medium 1. The postcure is a post step of recording information at a desired position within the optical-information recording medium 1 and then irradiating the recording medium with a predetermined light beam at the desired position to disable rewriting.

The disk rotation angle detection optical system 14 is used to detect the rotation angle of the optical information recording medium 1. When it is desired to adjust the optical-information recording medium 1 at a desired rotation angle, the rotation angle of the optical-information recording medium 1 can be controlled when the disk rotation angle detection optical system 14 detects a signal corresponding to the rotation angle and when the motor is controlled through a disk-rotating-motor control circuit 88 under control of the controller 89.

A predetermined light source driving current is supplied from a light source driving circuit 82 to respective light sources of the optical pickup 11, cure optical system 13 and disk rotation angle detection optical system 14, so that the respective light sources can emit light beams of predetermined light quantities. The optical pickup 11 and the cure optical system 13 have such a function that the positions of the pickup and the cure optical system can be slid in a radius direction of the optical-information recording medium 1, and their position control is carried out through an access control circuit 81. In this connection, instead of sliding the optical pickup 11 or cure optical system 13, a mechanism in which the position of the optical-information recording medium 1 is slid in its radius direction may be provided.

A storage area 92 is added, for example, as an area for temporarily storing information on the operation of the optical information recording/reproducing apparatus 10, and performs data transfer with the controller 89 as necessary.

Meanwhile, in the technique based on the angle multiplex recording, an allowable error to a shift of the reference beam angle tends to become highly small. Thus, it becomes necessary to provide a mechanism for detecting a shift in the reference beam angle within the optical pickup 11 to generate a signal for adjusting the reference beam angle in a reference-beam-angle shift generating circuit 83, and to provide an adjustment mechanism within the optical information recording/reproducing apparatus 10 for correcting the shift in a reference-beam-angle control circuit 84. The detailed explanation of the reference-beam-angle shift generating circuit 83 as one of features of the present invention will be made later.

Figure 2:
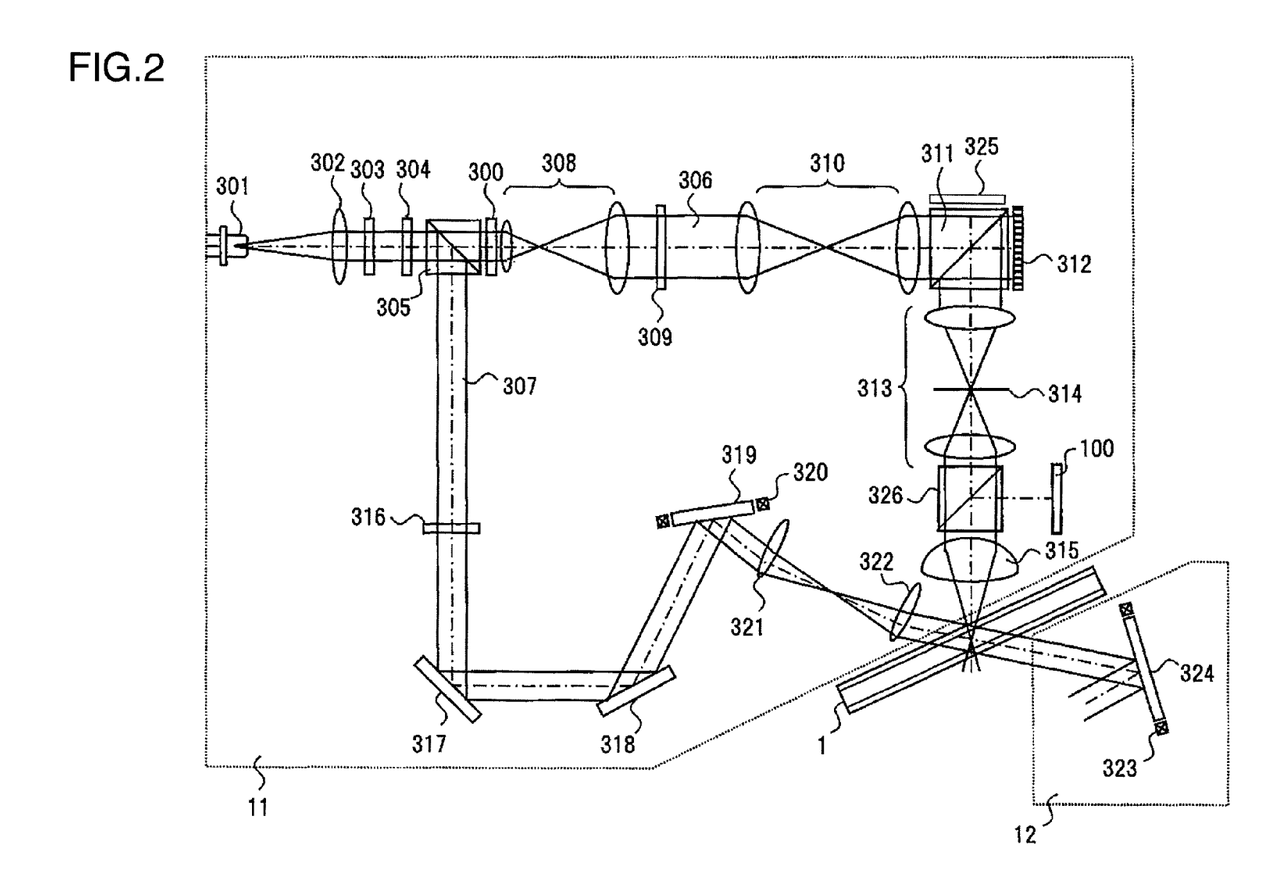
FIG. 2 schematically illustrates an embodiment of a pickup in the optical information recording/reproducing apparatus.

FIG. 2 illustrates, as an example, an optical system arrangement of the optical pickup 11 mounted in the optical information recording/reproducing apparatus 10. A light beam emitted from a light source 301 is passed through a collimating lens 302 and then directed to a shutter 303. When the shutter 303 is opened, the light beam is passed through the shutter 303, and directed to an optical element 304 made of, e.g., a ½ wavelength plate, in which the polarization direction of the incident light beam is controlled, for example, in such a manner that a ratio in the light quantity between the P polarized light and the S polarized light has a desired value. The polarized light is directed to a PBS (Polarization Beam Splitter) prism 305. A light beam passed through the PBS prism 305 is propagated along an optical path as signal beam 306, passed through a shutter 300 and a beam expander 308, in which the diameter of the light beam is expanded. The expanded light beam is then passed through relay lenses 310 and a PBS prism 311, and further directed to a spatial light modulator 312. Since the signal beam is spatially amplitude-modulated by the spatial light modulator 312, the signal beam having the added information is reflected by the PBS prism 311 and further propagated through relay lenses 313 and a spatial filter 314. Thereafter, the signal beam is passed through a prism 326 and focused on the optical-information recording medium 1 by an objective lens 315.

On the other hand, a light beam reflected by the PBS prism 305 is propagated along an optical path as reference beam 307, set by a polarization-direction conversion element 316 according to recording or reproduction so as to have a predetermined polarization direction, passed through a mirror 317 and a mirror 318, and then directed to a galvanometer mirror 319. The mirror angle of the galvanometer mirror 319 is adjusted by an actuator 320, so that a light beam reflected by the galvanometer mirror 319 can be set so as to have a desired angle. In this connection, as the element for setting the incident angle of the reference beam, an acoustic optical element, an electro-optical element or the like may be employed in place of the galvanometer mirror.

Since the signal beam and the reference beam are mutually overlapped and directed to the optical-information recording medium 1, this causes an interference pattern to be generated within the optical-information recording medium 1, a diffraction grating of refractive index modulation is formed according to the generated pattern, and the diffraction grating is recorded to the optical-information recording medium 1 as a hologram. Since the incident angle of the reference beam can be changed by the galvanometer mirror 319, recording based on the angle multiplex recording can be attained. In information having a hologram corresponding to each reference beam angle will be referred to as page data, hereinafter.

When it is desired to reproduce the recorded information, the reference beam is directed to the optical-information recording medium 1 along the aforementioned optical path and a light beam passed through the optical-information recording medium 1 is reflected by a galvanometer mirror 324 having an actuator 323 by which the angle of the galvanometer mirror 324 can be adjusted, whereby a phase conjugate beam for the reference beam used in recording is generated. The angle of the galvanometer mirror 324 in FIG. 2 is shown as an example in recording, and in recording the mirror angle is set so that the reference beam reflected by the galvanometer mirror 324 is not directed again to the optical-information recording medium 1. In reproduction, as mentioned above, the angle of the galvanometer mirror 324 is set so that the reference beam reflected by the galvanometer mirror 324 becomes a phase conjugate beam of the reference beam used in recording. Reproduced light reproduced by the phase conjugate beam is propagated through the objective lens 315, prism 326, relay lenses 313 and spatial filter 314. Thereafter, the reproduced light is passed through the PBS prism 311, and then directed to an optical detector 325, whereby the recorded page data can be reproduced. Although an imaging element such as a CMOS image sensor or a CCD image sensor, for example, can be used as the optical detector 325, any element may be employed so long as the element can reproduce the page data.

As already mentioned above, in the angle multiplex recording system, an allowable error for a shift of the reference beam angle tends to be very small. In particular, when it is desired to attain high density recording, it becomes necessary to record and reproduce a hologram with an angle division width set to be very small, and to make the angle accuracy of the reference beam higher. As a method of increasing the angle accuracy, when the absolute angle of the mirror angle of the galvanometer mirror 319 is highly accurately set, for example, the incident angle of the reference beam with respect to the optical-information recording medium 1 can be controlled to have a good accuracy to some extent. However, for example, when the incident angle of the reference beam 307 with respect to the galvanometer mirror 319 is shifted, this causes the incident angle of the reference beam with respect to the optical-information recording medium 1 to be shifted, and this shift cannot be corrected so long as the control target is directed only to the absolute angle of the mirror angle of the galvanometer mirror 319. In the present invention, since the incident angle of the reference beam with respect to the optical-information recording medium 1 is set to have a higher angle accuracy, an output signal from an optical detector 100, for example, is used for the control of the mirror angle of the galvanometer mirror 319.

Figure 3:
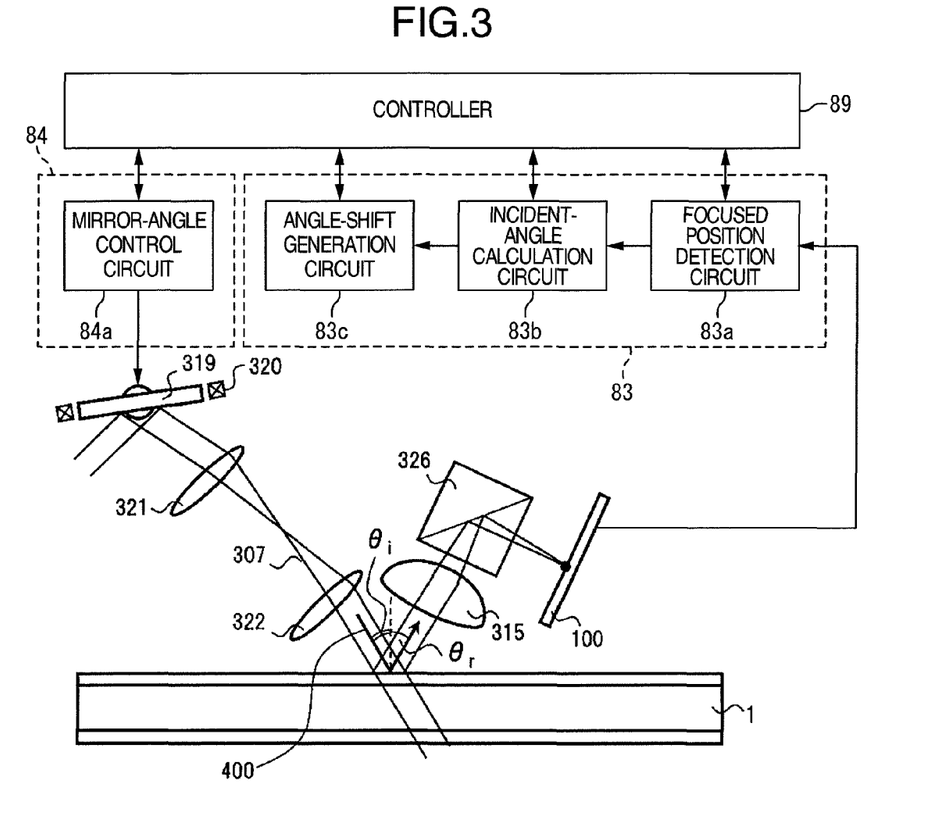
FIG. 3 schematically illustrates an embodiment of a part of the pickup in the optical information recording/reproducing apparatus.

As illustrated in FIG. 3, the optical detector 100 plays a role of receiving reflected light when the reference beam 307 is reflected by the surface of the optical-information recording medium 1. The focused position of the reflected light in the optical detector 100 varies with the magnitude of a reflected angle $\theta_r$ by the lens action of the objective lens 315. In the present invention, the focused position in the optical detector 100 is detected by a focused-position detection circuit 83a, and the reflected angle $\theta_r$ of the reflected light is calculated by an incident-angle calculation circuit 83b using information on the focused position. Since the focused position in the optical detector 100 is detected, a device having a plurality of pixels such as an imaging element is used as the optical detector 100 to detect the focused position.

When a main beam 400 of the reference beam is reflected by the surface of the optical-information recording medium 1, the reflection angle $\theta_r$ of the reflected light is equal to the incident angle $\theta_i$ of the reference beam with respect to the optical-information recording medium 1 by the reflection law. That is, in the incident angle calculation circuit 83b, the incident angle $\theta_i$ can be derived by calculating the reflection angle $\theta_r$. In an angle shift generation circuit 83c, a signal corresponding to an angle shift is generated using information on a target value of the incident angle of the reference beam and on the incident angle $\theta_i$ outputted from the incident angle calculation circuit 83b. The mirror angle of the galvanometer mirror 319 is controlled so as to correct the aforementioned angle shift through a mirror angle control circuit 84a in the reference beam angle control circuit 84.

Figure 4A:
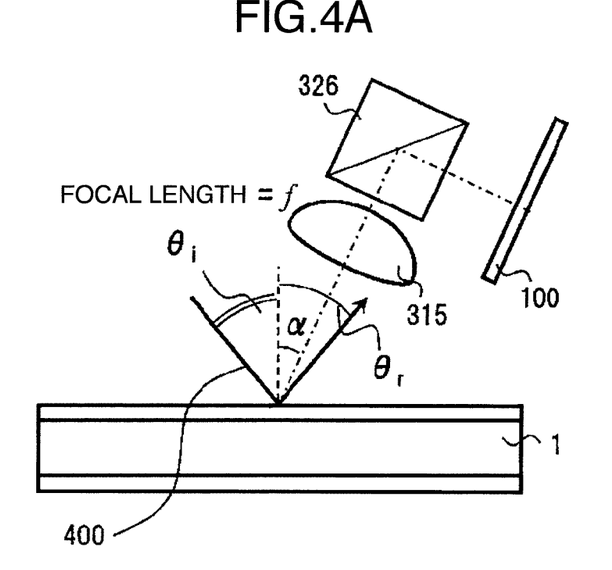
FIGS. 4A and 4B schematically illustrate a relationship among the tilt of an optical axis of an objective lens, an incident angle and a light collecting position relative to the objective lens.
Figure 4B:
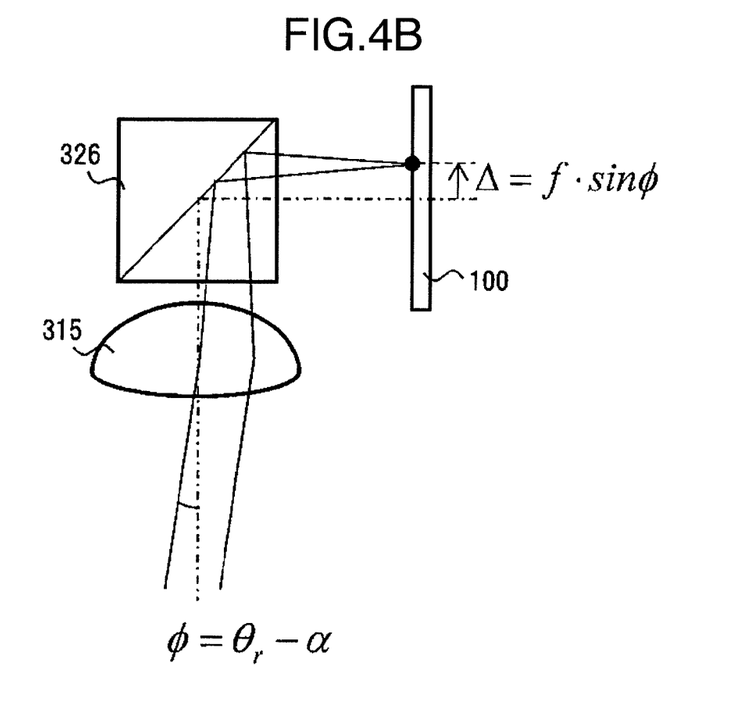

Next, a detailed method of calculating the incident angle $\theta_i$ of the reference beam from the focused position in the optical detector 100 will be explained below. As shown in FIG. 4A, for example, it is assumed that the optical axis of the objective lens 315 has a tilt of α and the objective lens 315 has a focal length of f. In this case, as shown in FIG. 4B, an incident angle φ with respect to the objective lens 315 can be expressed as φ=$\theta_r$−α using a reflection angle $\theta_r$ and an optical axis tilt α. When these parameters are used, the focused position in the optical detector 100 is at a position apart by Δ=f·sin φ from the axial axis center, assuming that the objective lens 315 is a Fourier transformation lens. That is, when a distance Δ is detected from the optical axis center, a reflection angle $\theta_r$ can be calculated according to Equation (1) which follows.

$$\theta_r = \sin^{-1}\left(\frac{\Delta}{f}\right) + \alpha \qquad \text{Equation (1)}$$

Figure 5:
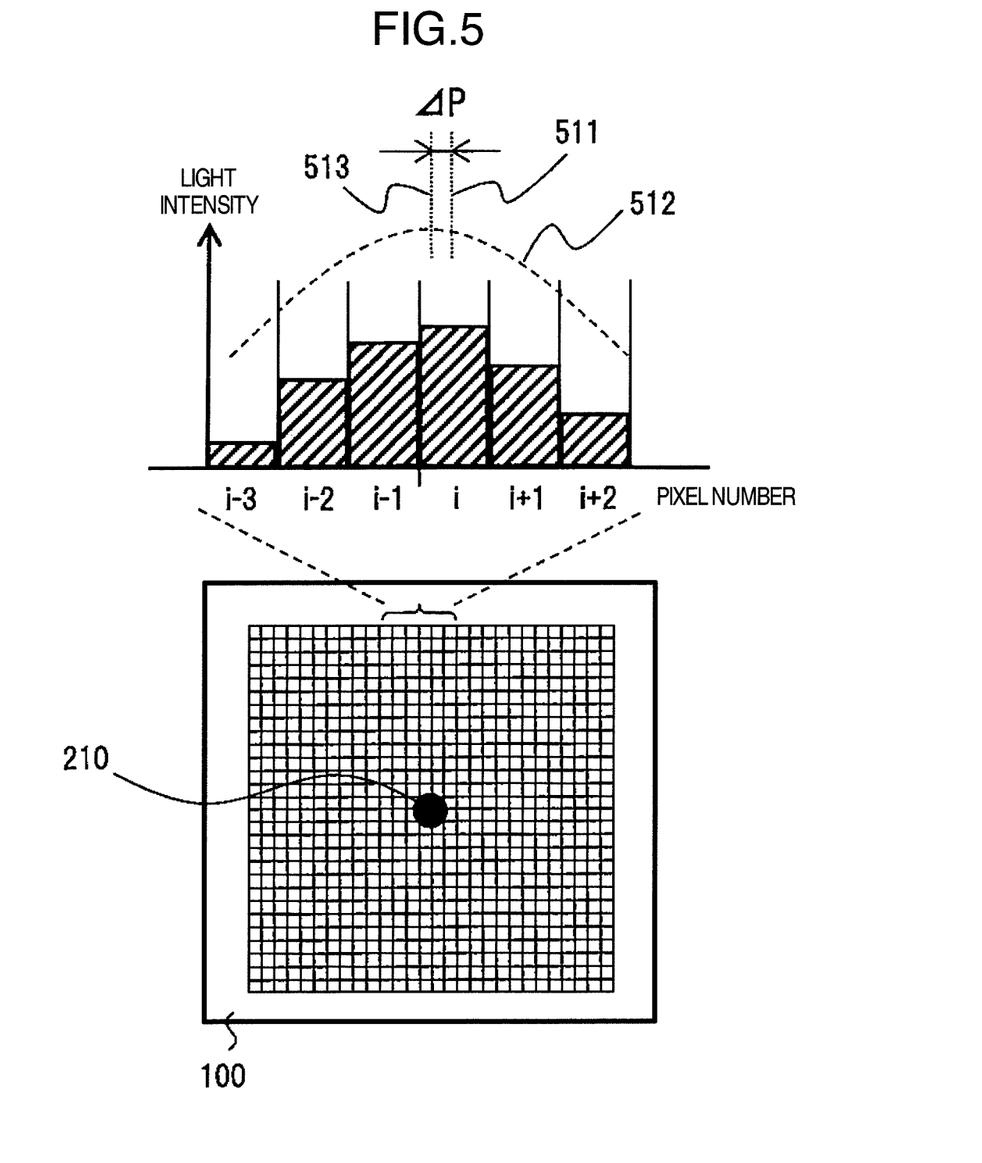
FIG. 5 schematically illustrates a light intensity distribution in an optical detector.

When a focused position in the optical detector 100 is found, the central position of one of pixels therein having a highest light intensity may be used. However, in order to attain a resolution of a size not larger than a pixel, it is also possible to find the focused position by interpolating between output values as illustrated in, e.g., FIG. 5. With respect to a spot 210 of the reflected light focused in the optical detector 100, a referential numeral 511 denotes a central position of the ones of pixels having a highest light intensity and a referential numeral 512 denotes a curve of the output values of pixels interpolated between the pixels on the basis of the output values of pixels. When a position on the curve having an external value is denoted by a referential numeral 513, the positions 511 and 513 have a difference of ΔP therebetween. The position 513 is considered to be correct as the focused position. Thus such interpolation enables detection of the focused position with an accuracy increased by ΔP.

As mentioned above, since the incident angle $\theta_i$ is equal to the reflection angle $\theta_r$, the incident angle $\theta_i$ of the reference beam can be calculated according to Equation (1). In this way, an angle shift from the incident angle as a target can be detected by calculating the incident angle $\theta_i$ of the reference beam. Thus, when the mirror angle of the galvanometer mirror 319 is corrected according to the angle shift, the incident angle of the reference beam can be accurately adjusted. Further, since the reflected light reflected by the surface of the optical-information recording medium 1 is used, it is unnecessary for a hologram to be previously recorded in the optical-information recording medium 1, and the incident angle can be adjusted even in the recording.

Embodiment 2

Figure 6A:
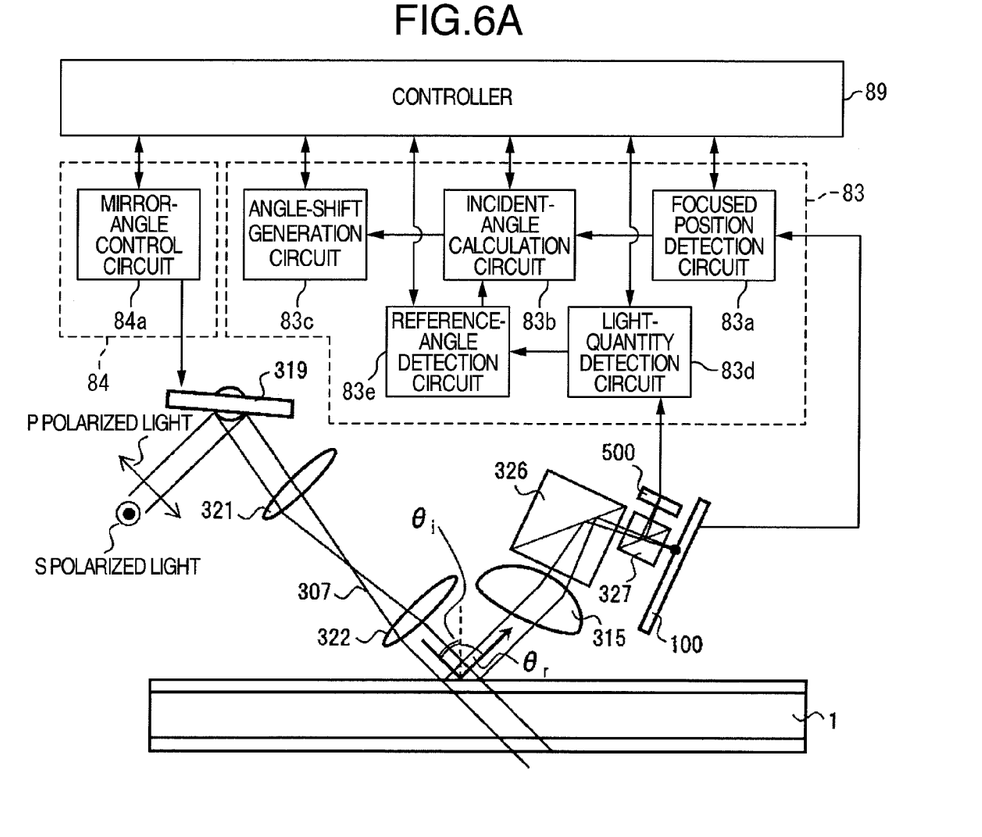
FIG. 6A schematically illustrates a part of a pickup within an optical information recording/reproducing apparatus.

With respect to the optical pickup 11 in the present invention, in addition to the arrangement of FIG. 2, an optical detector 500 and a beam splitter 327 for guiding light into the optical detector 500 may be newly added to the pickup as illustrated in FIG. 6A. In Embodiment 1, the center position of the optical axis of the objective lens 315 is defined as the reference position in the optical detector 100, a shift between the reference position and the position of the focused point is detected, and an incident angle is calculated according to Expression (1). In the present embodiment, use of the optical detector 500 enables definition of another reference position. As a result, for example, even when the position of the optical detector 100 is shifted and the center position of the optical axis of the objective lens in the optical detector 100 is shifted, an incident angle can be calculated.

In the present embodiment, as an example, the optical detector 500 is an optical detector for detecting the light quantity of at least a P polarized component of the reflected light when the reference beam 307 is reflected by the surface of the optical-information recording medium 1. Thus, in the present embodiment, in order to detect the light quantity of the P polarized light component, the optical detector 500 has an element such as a polarizing filter having a polarizing function, and it is also assumed that the reference beam directed to the optical-information recording medium 1 has at least the P polarized component. Of course, the reference beam may have both P and S polarized components.

Figure 6B:
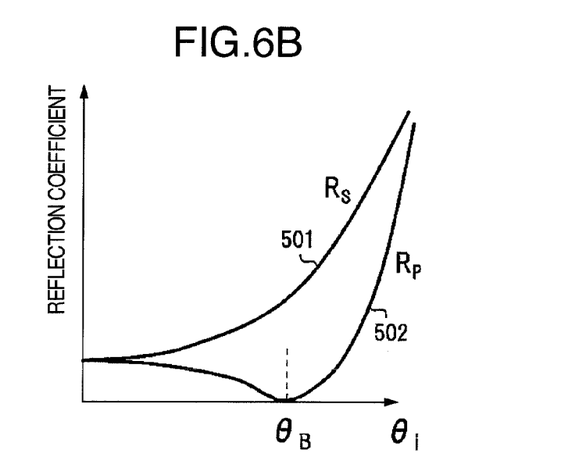
FIG. 6B schematically illustrates an incident angle dependency of a surface reflectance of an optical information recording medium.

A reflectance $R_P$ of the P polarized light and a reflectance $R_S$ of S polarized light vary according to the incident angle and have, for example, such characteristics as illustrated in FIG. 6B by referential numerals 501 and 502. In this case, an incident angle $\theta_B$ when the reflectance $R_P=0$ is called Brewster's angle, and when a refractive index on the surface of the optical-information recording medium 1 is denoted by n, the incident angle can be expressed by Equation (2) as follows.

$$\theta_B = \tan^{-1}(n) \qquad \text{Equation (2)}$$

In the present invention, in order that the optical detector 500 detects a light quantity of at least the P polarized light component, a light quantity detection circuit 83d illustrated in FIG. 6A detects the light quantity of, e.g., the P polarized light component and a reference angle detection circuit 83e detects an incident angle at which the light quantity becomes minimum, whereby a Brewster's angle $\theta_B$ as a reference angle can be found.

Figure 7A:
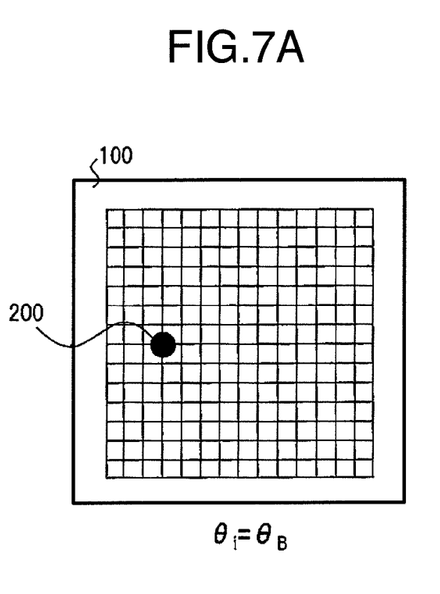
FIGS. 7A and 7B schematically illustrate a collected position of reflected light in an optical detector.
Figure 7B:
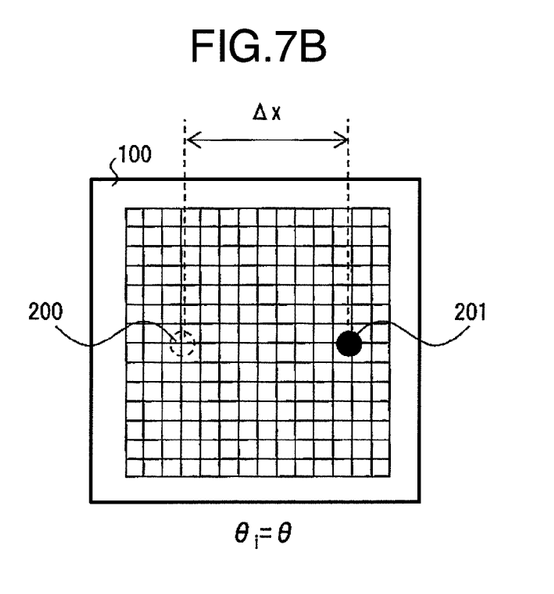

In Embodiment 1, where the center position of the optical axis of the objective lens 315 is set as the reference position, the focused position of the reflected light in the optical detector 100 was estimated as the shift from the reference position. In the present embodiment, on the other hand, the focused position of the incident light of the reference angle is estimated as the reference position. As illustrated in FIGS. 7A and 7B, for example, it is assumed that the focused position in the optical detector 100 is denoted by a referential numeral 200 when incident angle $\theta_i=\theta_B$, and that the focused position is denoted by a referential numeral 201 when incident angle $\theta_i=\theta$. Then, based on the same concept as in Embodiment 1, a shift Δx at the focused position can be expressed by Equation (3) as follows.

$$\Delta x = f \cdot \{\sin(\theta_B - \alpha) - \sin(\theta - \alpha)\} \qquad \text{Equation (3)}$$

That is, the incident angle θ can be calculated using Equation (4) which follows by detecting the shift Δx at the focused position.

$$\theta = \sin^{-1}\left\{\sin(\theta_B - \alpha) - \frac{\Delta x}{f}\right\} + \alpha \qquad \text{Equation (4)}$$

In this way, when the Brewster's angle $\theta_B$ is used as the reference angle and the position of the focused point in the optical detector 100 when the light is incident with the reference angle is used as the reference position, the incident angle $\theta_i$ can be calculated without using information on the center position of the optical axis of the objective lens 315. Further, even when the optical-information recording medium 1 is slightly tilted, use of the Brewster's angle $\theta_B$ as the reference angle enables the accurate calculation of the incident angle $\theta_i$. Thus, as in Embodiment 1, an angle shift from the target incident angle can be detected, and the incident angle of the reference beam can be accurately adjusted by correcting the mirror angle of the galvanometer mirror 319 according to the angle shift.

Embodiment 3

Figure 8A:
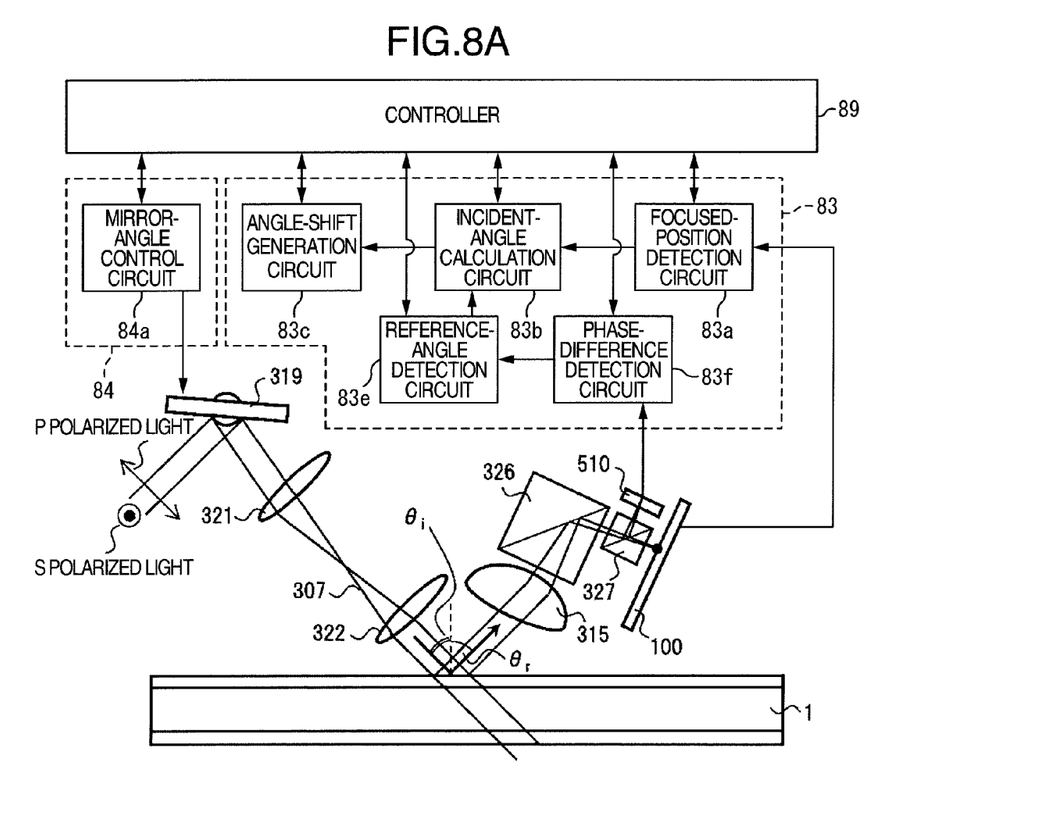
FIG. 8A schematically illustrates an embodiment of a part of a pickup within an optical information recording/reproducing apparatus.

In Embodiment 2, in order to find the Brewster's angle $\theta_B$, the light quantity of at least the P polarized light component was detected and an angle, for example, when the light quantity of the P polarized light component becomes minimum was detected by the reference angle detection circuit 83e. The present embodiment has a feature that, as shown in FIG. 8A, a phase difference detector 510 is provided in place of the optical detector 500, and the Brewster's angle $\theta_B$ is found by paying attention to a phase difference of the P polarized light component of the reflected light reflected by the surface of the optical-information recording medium 1 from the S polarized light component of the reflected light.

With regard to detailed techniques for detecting the phase difference, various techniques are already proposed and already well known, so that the detailed explanation thereof will be omitted.

Figure 8B:
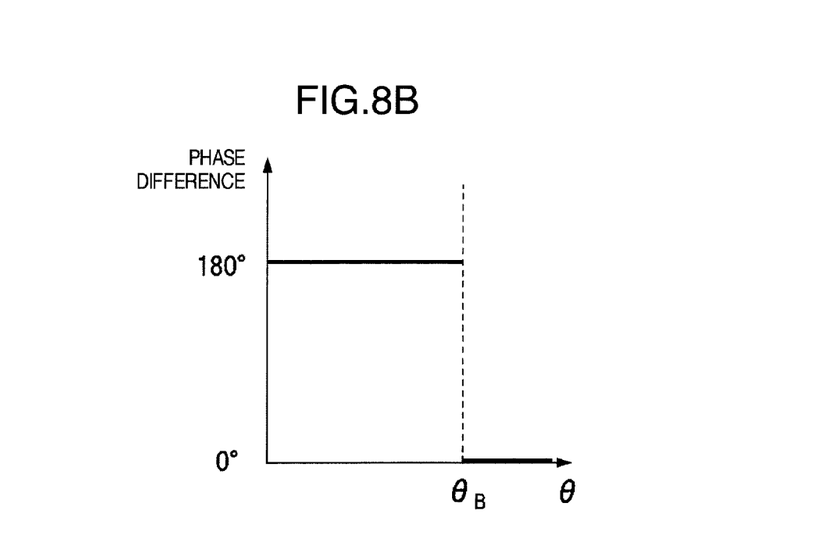
FIG. 8B schematically illustrates an incident angle dependency of a phase difference of reflected light in an optical information recording medium.

As illustrated in FIG. 8B, a phase difference of the P polarized light component of the reflected light reflected by the surface of the optical-information recording medium 1 from the S polarized light component of the reflected light is 180 degrees in an angle range nearly from a shallow incident angle or from a nearly vertical incident angle to the Brewster's angle, and becomes zero beyond the Brewster's angle.

The present embodiment has a feature in that the Brewster's angle $\theta_B$ is found by paying attention to a change in the phase difference. More specifically, the Brewster's angle $\theta_B$ is found by scanning the incident angle of the reference beam in a predetermined angle range and detecting an angle when the phase difference is changed. After the reference angle is found, the incident angle $\theta_i$ of the reference beam can be calculated based on a principle similar to Embodiment 2. When the incident angle $\theta_i$ of the reference beam is calculated in this way, an angle shift from the target incident angle can be detected. Thus, the incident angle of the reference beam can be accurately adjusted by correcting the mirror angle of the galvanometer mirror 319 according to the detected angle shift.

Although the above explanation has been made in connection with the incident angle of the reference beam in the angle multiplex direction, the angle of the reference beam even in a direction vertical to the angle multiplex direction can also be detected based on a principle similar thereto. By newly providing the optical pickup with a mirror or the like for changing the angle of the reference beam with respect to the direction vertical to the angle multiplex direction, the mirror angle can be corrected based on the similar principle, and the incident angle of the reference beam can be accurately adjusted even with respect to the direction vertical to the angle multiplex direction.

Further, in the angle multiplex recording, the angle of the reference beam may be adjusted by previously storing the focused positions in the optical detector 100 by an angle multiplex number, previously storing the focused position information in the storage area 92 of the optical information recording/reproducing apparatus 10, taking out the information on the focused position kept in the storage area 92, and making the taken-out information to correspond to the focused positions in reproduction.

Further, the reflected light reflected by the surface of the optical-information recording medium 1 may be detected by using the optical detector 325 for reproducing the page data in place of the optical detector 100. When the number of pixels in the optical detector 325 is large, only a necessary pixel area is made effective to shorten a time required by detection and to attain high speed detection only when the incident angle of the reference beam is calculated.

Embodiment 4

Figure 9:
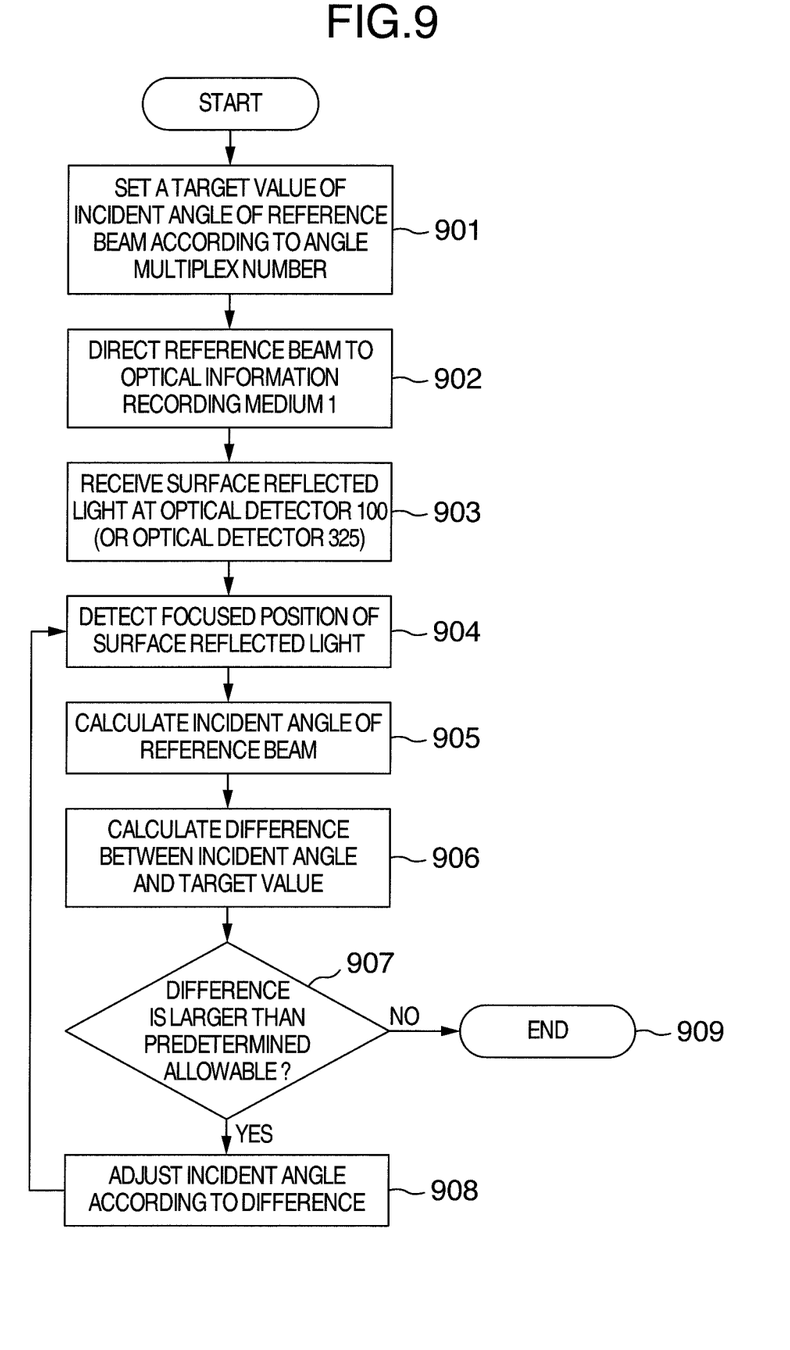
FIG. 9 schematically shows an embodiment of a flow of operations of the optical information recording/reproducing apparatus.

FIG. 9 is a flow chart for explaining a method of correcting the incident angle of the reference beam in the present invention. In order to record or reproduce information, a target value of the incident angle of the reference beam is set, for example, according to an angle multiplex number (step 901), the mirror angle of the galvanometer mirror 319 is set at a predetermined angle, and then the reference beam is directed to the optical-information recording medium 1 (step 902). Next, the reflected light of the reference beam reflected by the surface of the optical-information recording medium 1 is received by the optical detector 100 or by the optical detector 325 in place of the optical detector 100 as mentioned above (step 903). A focused position of the reflected light is detected by the optical detector 100 or the optical detector 325 (step 904), and then an incident angle of the reference beam to the optical-information recording medium 1 is calculated by using information on the focused position (step 905). The method of calculating the incident angle of the reference beam from the focused position information is already explained in detail in Embodiments 1 to 3, and thus explanation thereof is omitted.

After the incident angle of the reference beam is calculated, a difference from the target value of the incident angle is estimated (step 906), and comparison is made between the estimated difference and a preset allowable value (step 907). When the difference is larger than the predetermined allowance, the incident angle of the reference beam is adjusted by correcting the mirror angle of the galvanometer mirror 319 according to the difference (step 908), and control returns again to the step 904 of the flow chart. When the difference is not larger than the predetermined allowance, adjustment of the incident angle is terminated (step 909) and recording or reproduction of the information is carried out.

Embodiment 5

Figure 10:
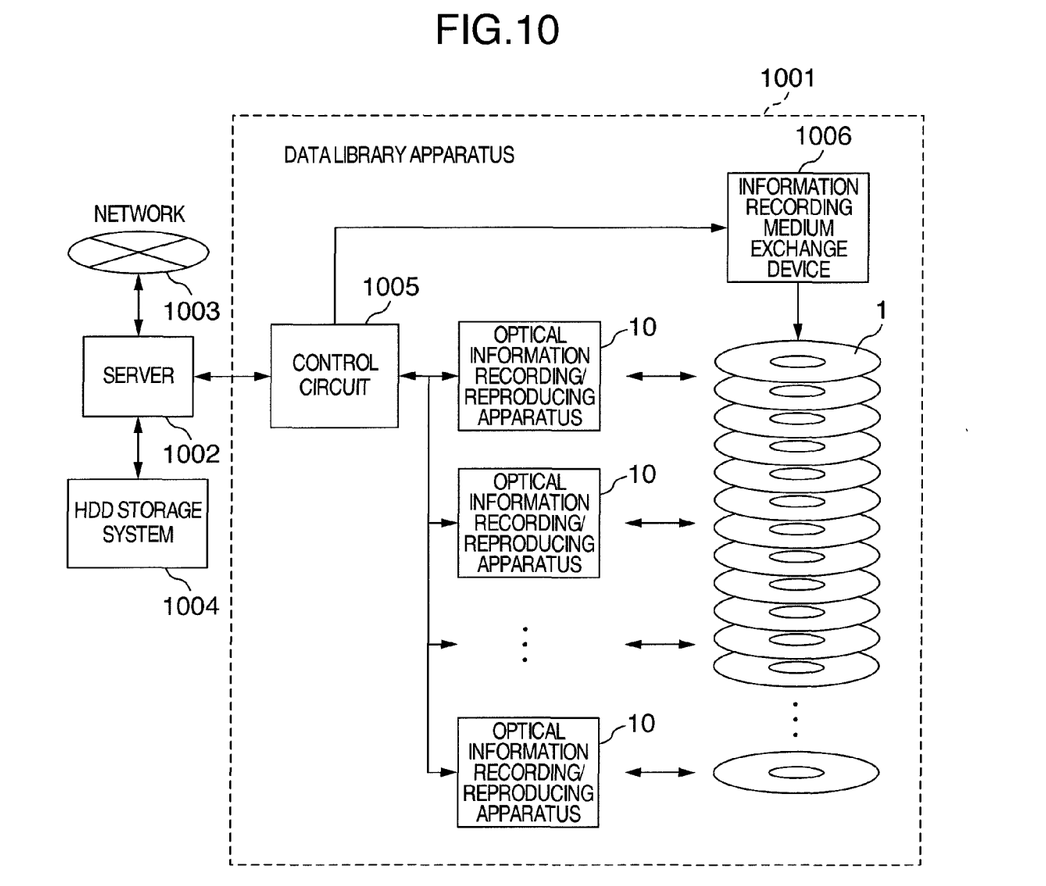
FIG. 10 schematically shows a block diagram of an arrangement of a data library apparatus.

FIG. 10 shows a block diagram of an arrangement of an embodiment of a data library apparatus having the aforementioned optical information recording/reproducing apparatus 10 mounted therein. A data library apparatus 1001 records, according need, data stored in a hard disk 1004 to the optical-information recording medium 1 from a network 1003 via a server 1002. Alternatively, the data library apparatus 1001 reproduces data from the optical-information recording medium 1 and transmits the reproduced data to the network 1003. The server 1002 controls an HDD storage system 1004 having hard disks and the data library apparatus 1001, and manages the data sent from the network 1003. The HDD storage system 1004 records or reproduces the data sent from the network 1003 under control of the server 1002.

A plurality of such optical-information recording media 1 are provided in the data library apparatus 1001, selected by an information-recording-medium exchange device 1006, mounted in the optical information recording/reproducing apparatus 10, and data is recorded or reproduced thereby. The optical information recording/reproducing apparatus 10 records or reproduces data in or from the optical information recording medium under control of a control circuit 1005. The information-recording-medium exchange device 1006 exchanges the optical information recording media mounted in the optical information recording/reproducing apparatus 10 under control of the control circuit 1005.

The control circuit 1005 controls the information-recording-medium exchange device 1006 in response to a request from the server 1002, selects desired one of the plurality of sheets of optical information recording media, and sends to the optical information recording/reproducing apparatus 10.

The data library apparatus 1001 has a plurality of such optical information recording/reproducing apparatuses 10, and thus, data recording or reproduction can be carried out simultaneously in or from the plurality of optical information recording media. As a result, data can be recorded or reproduced at a high speed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A holographic memory apparatus which causes interference between a reference beam and signal beam, records an obtained interference pattern in a hologram recording medium as page data by angularly multiplexed recording, and reproduces the recorded page data, the apparatus comprising:
    an optical detector which receives reflected light of the reference beam from the surface of the hologram recording medium;

an angle changing unit which changes an incident angle of the reference beam with respect to the hologram recording medium;

a detection circuit which detects a focused position of the reflected light on the optical detector;

an incident angle calculation circuit which estimates an incident angle of the reference beam with respect to the hologram recording medium on the basis of information on the focused position;

an angle shift generation circuit which generates a difference between the incident angle of the reference beam and a target value thereof; and a control circuit which controls the angle changing unit according to the angle shift.

2. The holographic memory apparatus according to claim 1, further comprising a light quantity detection unit which detects a light quantity of at least a P polarized light component in the reflected light of the reference beam from the surface of hologram recording medium.

3. The holographic memory apparatus according to claim 1, further comprising a phase difference detection unit which detects a phase difference between an S polarized light component and a P polarized light component of the reflected light of the reference beam from the surface of the hologram recording medium.

4. The holographic memory apparatus according to claim 1, wherein the angle changing unit has a first angle changing unit which changes an angle of the reference beam in a Bragg angle direction and a second angle changing unit which changes an angle of the reference beam in a degenerate direction vertical to the Bragg angle direction.

5. The holographic memory apparatus according to claim 1, further comprising a storage area which stores a focused position of the reflected light on the optical detector.

6. A method of adjusting an incident angle of a reference beam with respect to a hologram recording medium in a holographic memory apparatus which causes interference between the reference beam and signal beam, records an obtained interference pattern in the hologram recording medium as page data by angularly multiplexed recording, and reproduces the recorded page data, wherein the holographic memory apparatus comprises:

an optical detector which receives reflected light of the reference beam from the surface of the hologram recording medium;

an angle changing unit which changes an incident angle of the reference beam with respect to the hologram recording medium;

a detection circuit which detects a focused position of the reflected light on the optical detector;

an incident angle calculation circuit which estimates an incident angle of the reference beam with respect to the hologram recording medium on the basis of information on the focused position;

an angle shift generation circuit which generates a difference between an incident angle of the reference beam and a target value thereof; and a control circuit which controls the angle changing unit according to the angle shift, and wherein the incident angle of the reference beam is estimated on the basis of the information on the focused position of the reflected light, and then the incident angle of the reference beam is adjusted by the angle changing unit according to a difference between the incident angle and the target value thereof when the incident angle is different from the target value.

7. The method according to claim 6, wherein the target incident angle is sequentially changed according to a multiplex number.

8. The method according to claim 7, wherein previously storing the focused position of the reflected light of the reference beam on the optical detector in the storage area in recording, taking out information on the focused position from the storage area, and the incident angle of the reference beam is adjusted such that the focused position of the reflected light of the reference beam coincides with the focused position in reproducing.

* * * * *